Figure 1:
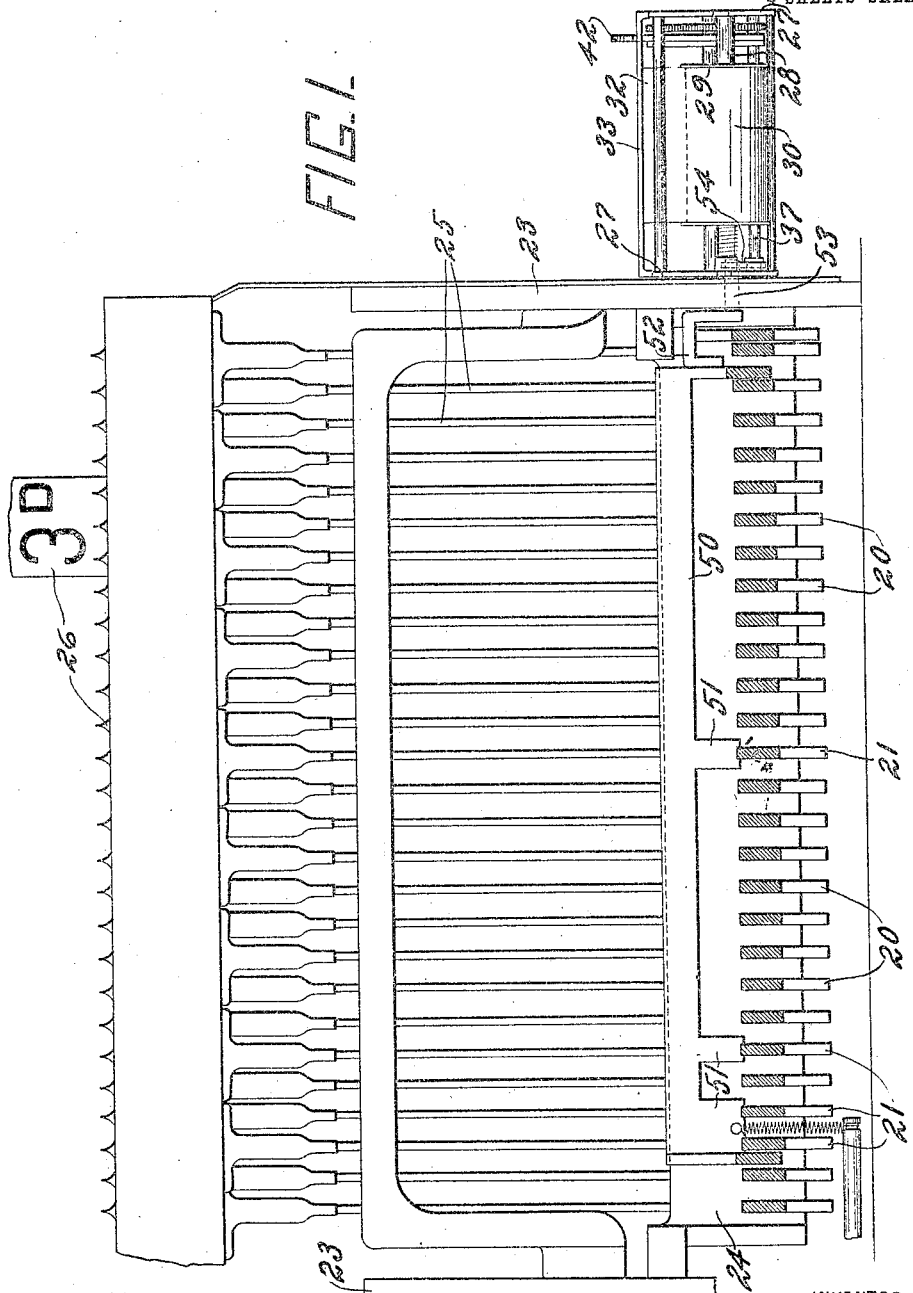

C. PALMER.
R. BRIDEN, RECEIVER IN LUNACY OF SAID PALMER.
CASH REGISTER.
APPLICATION FILED SEPT. 26, 1910.

1,033,455.

Patented July 23, 1912.

4 SHEETS—SHEET 1.

C. PALMER.
R. BRIDEN, RECEIVER IN LUNACY OF SAID PALMER.
CASH REGISTER.
APPLICATION FILED SEPT. 26, 1910.

1,033,455.

Patented July 23, 1912.

UNITED STATES PATENT OFFICE.

CHARLES PALMER, OF CATFORD, ENGLAND, BY ROBERT BRIDEN, OF LONDON, ENGLAND, RECEIVER IN LUNACY OF SAID PALMER.

CASH-REGISTER.

1,033,455.  Specification of Letters Patent.  Patented July 23, 1912.

Application filed September 26, 1910. Serial No. 583,921.

*To all whom it may concern:*

Be it known that I, ROBERT BRIDEN, a subject of the King of Great Britain and Ireland, residing at London, in England, am the receiver in lunacy of CHARLES PALMER, who has invented certain new and useful Improvements in Cash-Registers, of which I declare the following to be a full, clear, and exact description.

This invention relates to cash registers and has more particular relation to that class of registers provided with an autographic attachment including a strip of record material adapted to receive written entries of transactions.

The present improvements are, for the sake of illustration, shown as applied to the type of machine shown and described in Letters Patent of the United States granted to Thomas Carney, 497860, on May 23, 1893 and reference may be had to the said patent for a more detailed description of a machine of that type. In machines of this type there are generally provided a plurality of amount keys adapted when operated to register and indicate various amounts. A series of special transaction keys are also provided adapted to indicate various classes of special transactions such as "charge", "paid out", "received on account", and "no sale". In registering a cash transaction, amount keys representing the amount of such transaction are depressed and such amount is indicated and recorded. If a "charge", "paid out", or "received on account" transaction is to be recorded, the special key appropriate to the particular class of transaction in hand must be depressed in addition to the amount keys. If it is merely desired to open the cash drawer without recording an amount only the "no sale" key is depressed. It has been customary when using this class of machines in recording special transactions, to place in the cash drawer of the machine a paper check or slip bearing data pertaining to the transaction, e. g. in the case of a "charge" or "received on account" transaction, the name of the person to whose account the amount of the transaction is to be debited or credited, and in the case of a "paid out" transaction, why the money was paid out. With that system there is always the possibility of one of the slips becoming lost, and the record is therefore not entirely reliable.

To correct the above defect in accounting systems the present improvements provide means whereby a positive check may be kept on all transactions. In the use of the autographic attachment all entries formerly made on separate slips may be made on the record strip.

In some systems it is desired to have the autographic attachment operate only when recording the special classes of transactions, while in other uses it is desired to have the attachment operated at each actuation of the machine.

The principal object of the invention is to provide improved controlling mechanism for the autographic attachment, said controlling mechanism being capable of adjustment to render the said attachment operative at each operation of the machine or merely when recording special classes of transactions.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 2:
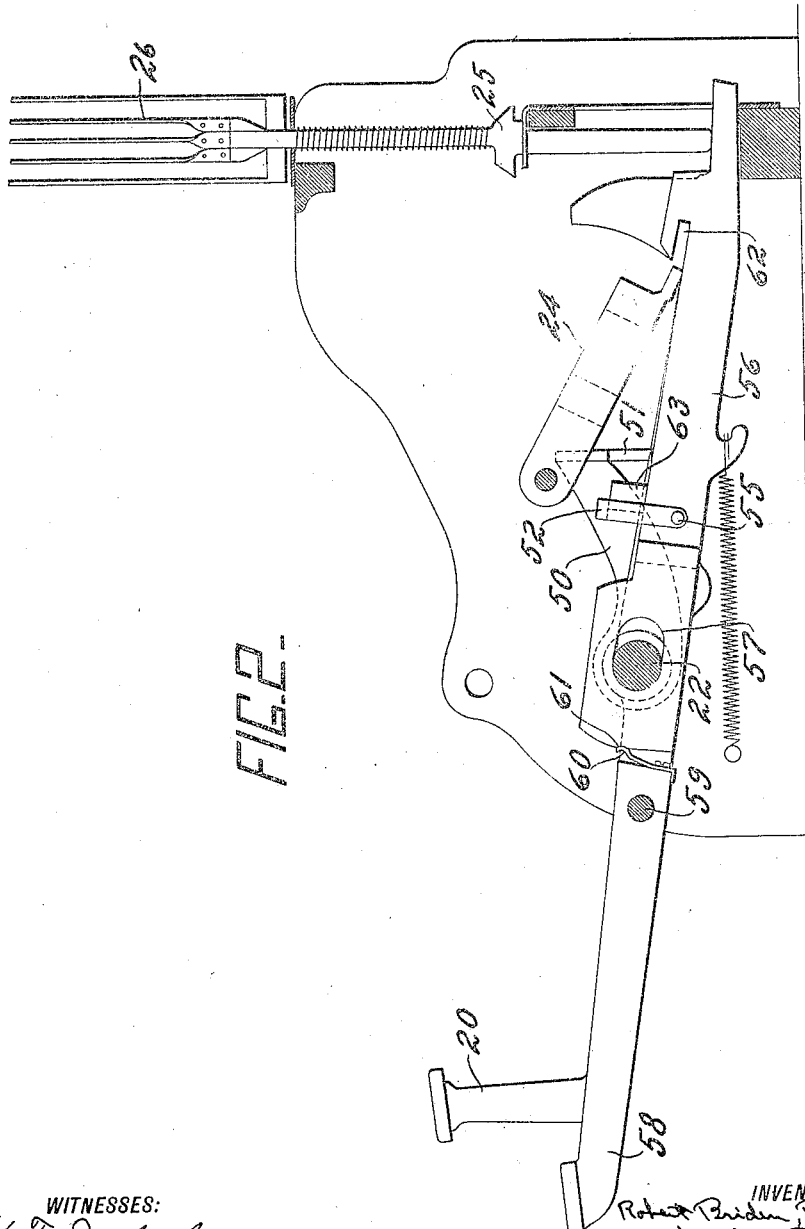
Figure 3:
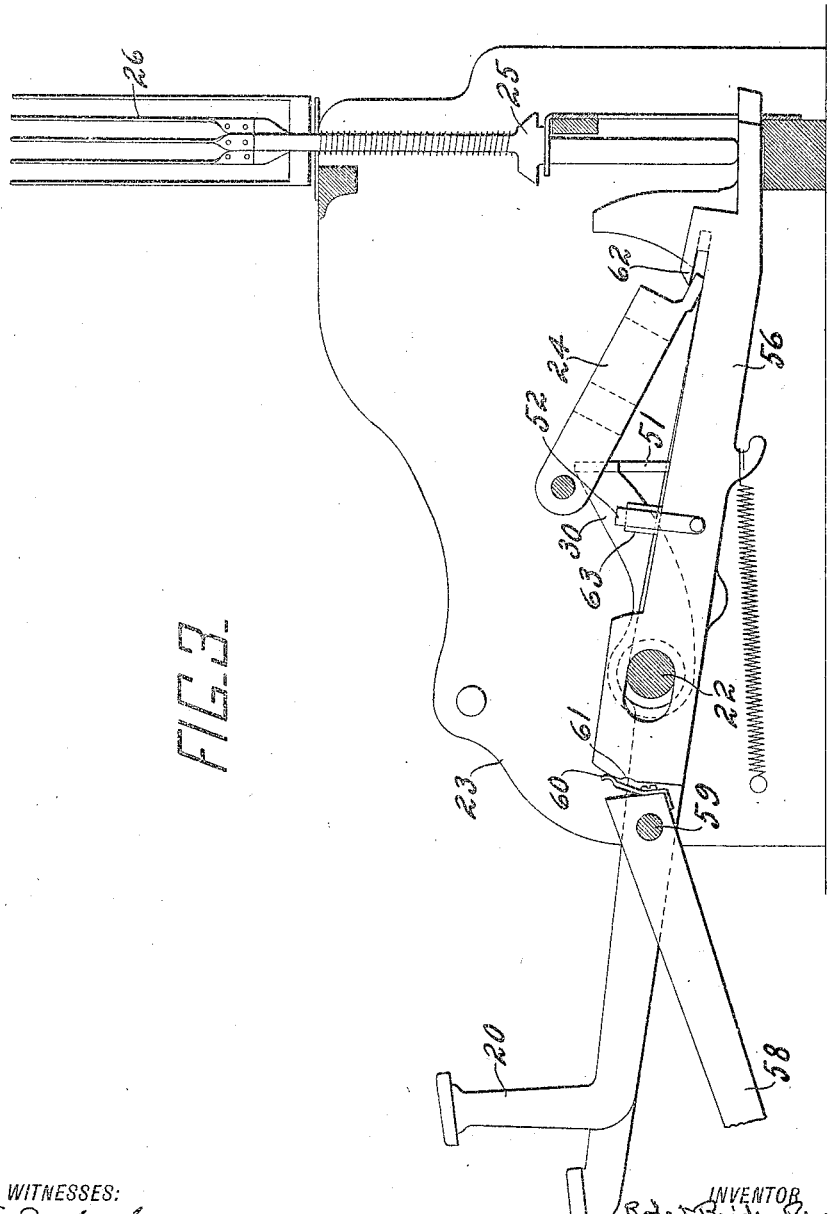
Figure 4:
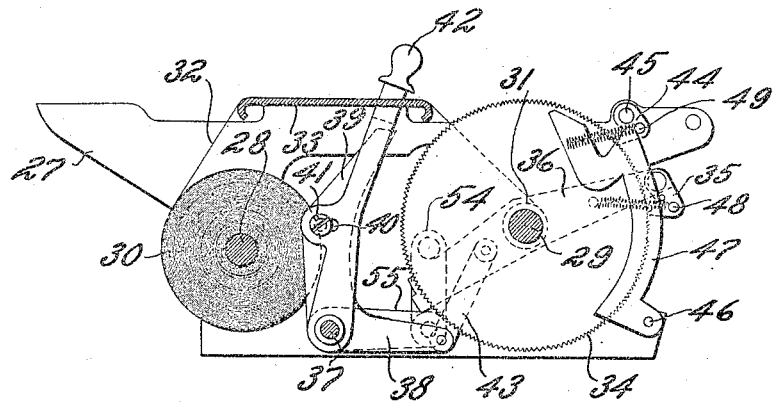

Figure 1 is a front view of a machine with the present improvements applied thereto, the forward ends of the key levers being broken away for the sake of clearness. Fig. 2 is a cross section of the machine showing the controlling mechanism for the autographic attachment in one position of adjustment. Fig. 3 is a section similar to Fig. 2 but showing the controlling mechanism in another position of adjustment. Fig. 4 is an enlarged sectional veiw of the autographic attachment showing the operating mechanism therefor.

The operation of the machine to which the present improvements are applied is substantially the same as that shown and described in the above mentioned Letters Patent but for convenience may be briefly described as follows: The machine comprises a series of amount key levers 20 and special key levers 21 pivotally mounted on a transverse rod 22 hung between the side frames 23. Each key 20 and 21 is adapted when operated to raise and lower a key coupler mechanism 24 of well known form.

The key coupler 24 is pivotally mounted in the side frames 23 and extends above all the keys 20 and 21 to the rear of the rod 22.

Mounted to rest on the rear end of each of the keys 20 and 21 are a series of standards 25, each of which carries at its upper end a "flag" 26 of well known form and adapted to indicate the record made at an operation of its appropriate key. At an operation of one of the keys 20 or 21 its appropriate indicator flag 26 will be raised and held in such position to expose to view, through a suitable opening in the cabinet (not shown), the numerals or wording carried thereby.

For convenience the autographic attachment is located at the right hand end of the machine and comprises the side pieces 27 between which are hung the rods 28 and 29 supporting the supply and receiving rolls 30 and 31 respectively. The paper strip 32 is led from the supply roll 30 up over the writing table 33 supported by the side pieces 27 and then down to the receiving roll 31. Mounted on the side of the receiving roll is a feeding ratchet 34 co-acting with a feeding pawl 35 carried by a lever 36 pivotally mounted on the rod 29.

Mounted fast on a shaft 37 is a bell crank lever 38, the upwardly extending arm of which is connected by a slot and pin connection 40 and 41 to a small operating lever 42 pivoted loose on the rock shaft 37. The other end of the bell crank lever 38 is connected by a link 43 to lever 36, and upon the operation of the lever 42 serves to rock said lever about the rod 29 to rotate the feeding ratchet 34, thereby to advance the record strip. A small retaining pawl 44 pivoted at 45 to the side frame 27 is spring drawn in engagement with ratchet 34 thereby preventing any retrograde movement of said ratchet. The purpose of the slot and pin connection 40 and 41 between the arm 39 and the lever 42 is to permit relative adjustment of the arm and lever thereby to control the feed for the record strip.

As it is sometimes desired to unwind the record strip from the receiving roll 31 it is necessary to provide means for disengaging the pawls 35 and 44 from the ratchet 34, to permit of such unwinding. To effect such a disengagement there is pivoted at 45, to the frame 27, a lever 47 which, when rocked to the right (Fig. 4), will engage pins 48 and 49 carried by the pawls 35 and 44 respectively, thereby to disengage said pawls from the feeding ratchet 34.

The mechanism whereby the autographic device may be operated on all or certain operations of the machine will now be described. Pivoted to swing on rod 22 is a yoke frame 50 which frame extends across all of the keys and is provided with downwardly extending lugs 51 which normally rest on the upper edges of the special keys 21. By this construction it will readily be seen that the frame 50 will be rocked upon each operation of any one of the special keys 21 but will not be affected by an operation of any one of the amount keys 20, as the main cross bar of frame 50 is held clear of said amount keys 20 by the lugs 51.

Mounted on the right hand end of frame 50 is a shoulder 52 carrying a pin 53 which extends through the frame of the machine, and is connected by a link 54 to an arm 55 rigidly mounted on the rock shaft 37. It will thus be seen that an operation of a special key 21 will result in rocking frame 50 and through the medium of said frame and the connections just described, will rock shaft 37 and consequently advance the record strip 32.

As before stated it is sometimes desirable to have the autographic strip fed upon every operation of the machine regardless of the key operated. As the coupler 24 is actuated at every operation of the machine it forms a convenient means for so operating the autographic attachment. Means are provided for coupling the feeding mechanism for the autographic device to said coupler at will, said means comprising a plate 56 slotted at 57 to surround and slide upon rod 22 and its other end being mounted to rest upon the frame work of the machine. Plate 56 is normally spring drawn toward the front of the machine but such movement is prevented by a key stem 58 pivoted at 59 to the main frame of the machine and having a heavy leaf spring 60 adapted to engage in the notch 61 in the forward end of said plate 56. If it is desired to have the autographic device fed at every operation of the machine it is merely necessary to depress the key stem 58 to rock it around its pivot 59 and thus disengage the said leaf spring 60 from the notch 61 in plate 56, thereby permitting said plate to slide forwardly under the action of its spring, thereby to cause the notch 62 formed in the rear end of said plate to engage the flange of the coupler 24, and also to cause the lug 63 formed on the upper edge of said plate 56 to move beneath the shoulder 52 before mentioned. It will thus be seen that when the coupler 24 is then rocked upon the operation of any one of the keys 20 or 21, its flange will engage the notch 62 and thus elevate the rear end of the plate 56. When the rear end of the plate 56 is so elevated, the lug 63 will engage the shoulder 52 of the yoke 50 and raise said yoke in a manner similar to the operation given above with reference to the special keys. When the shoulder 52 is so elevated it will, through the medium of pin 53, link 54, and arm 55, rock the shaft 37 and thus advance the autographic strip. After so operating the machine if the operator may then desire to again have the autographic strip fed merely when the special keys are operated, it will only be necessary to raise the forward end of the key stem 58 to cause the leaf spring 60 to force said plate 56 rearwardly until said spring again engages the notch 61 formed in said plate. It will thus be seen that as long as said key stem 58 is in a raised position an operation of the autographic strip will only be effected upon the depression of one of the special keys and then through the medium of the lugs 51, yoke 50, shoulder 52, pin 53, link 54, and arm 55. If it be desired to have the autographic strip fed upon every actuation of the machine a depression of the key stem 58 will cause the plate 56 to engage with the key coupler 24 and then upon the actuation of said coupler at each operation of the machine the autographic strip will be fed through the medium of the plate 56, shoulder 52, pin 53, link 54, and arm 55.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a cash register, the combination with a plurality of keys, of a main actuator actuated at each operation of the machine, an autographic attachment having a feeding device for record material, means intermediate said feeding device and certain of said keys for actuating said device independent of the movement of the main actuator whenever one of said certain keys is operated and means intermediate said feeding device and main actuator and capable of coöperation therewith actuating said device upon each operation of the main actuator and means for establishing or destroying such coöperation at will.

2. In a cash register, the combination with a plurality of keys, of a main actuator actuated at each operation of any of said keys, an auxiliary actuator actuated only when certain of said keys are operated, a recording device having record material, and a feeding mechanism therefor, connections intermediate the auxiliary actuator and said feeding mechanism for operating said feeding mechanism at each actuation of the auxiliary actuator, and manipulative means for establishing a coöperative relation between said main and auxiliary actuators whereby to operate said feeding mechanism at each actuation of the main actuator.

3. In a cash register, the combination with a plurality of keys, of a main actuator, an auxiliary actuator, an autographic device including a feeding mechanism for record material, connections intermediate the feeding mechanism and the auxiliary actuator whereby said feeding mechanism will be actuated at each operation of the auxiliary actuator, means for establishing a coöperative relation between the main and auxiliary actuators to effect an operation of the auxiliary actuator at each operation of the main actuator, said means comprising a pivoted sliding plate adapted to be coupled to the main actuator and be operated thereby, and manually adjustable means for effecting such coupling operation.

4. In a cash register, the combination with amount and special keys, of an autographic device including paper feeding means, a key coupler, a frame having projections positioned to be engaged by said special keys, connections from said frame to said autographic feeding device, an arm having a projection normally inoperative relative to said frame, and key controlled means for moving said arm to a position for operation by said coupler and in which said arm projection may engage and operate said frame.

In witness whereof I have signed this specification in the presence of two witnesses.

ROBERT BRIDEN.

Witnesses:
A. J. HADDAN,
A. E. HATHAWAY.